US011029750B2

(12) United States Patent
Srivastava et al.

(10) Patent No.: US 11,029,750 B2
(45) Date of Patent: Jun. 8, 2021

(54) APPARATUS FOR UNIVERSAL SERIAL BUS 2.0 (USB2) COMBINED HIGH SPEED SQUELCH AND DISCONNECT DETECTION

(71) Applicant: Intel Corporation, Santa Clara, CA (US)

(72) Inventors: Amit Kumar Srivastava, Bayan Lepas (MY); Chenchu Punnarao Bandi, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 15/638,049

(22) Filed: Jun. 29, 2017

(65) Prior Publication Data

US 2019/0004590 A1     Jan. 3, 2019

(51) Int. Cl.
*G06F 1/3287* (2019.01)
*G06F 1/3215* (2019.01)
*G06F 1/3234* (2019.01)
*G06F 13/42* (2006.01)
*G06F 13/40* (2006.01)

(52) U.S. Cl.
CPC .......... *G06F 1/3287* (2013.01); *G06F 1/3215* (2013.01); *G06F 1/3253* (2013.01); *G06F 13/4022* (2013.01); *G06F 13/4282* (2013.01); *G06F 13/40* (2013.01); *G06F 13/42* (2013.01)

(58) Field of Classification Search
CPC .... G06F 1/3287; G06F 1/3215; G06F 1/3253; G06F 13/4022; G06F 13/4282; G06F 13/40; G06F 13/42
USPC ....................................................... 713/320
See application file for complete search history.

(56) References Cited

U.S. PATENT DOCUMENTS

| 6,486,710 | B1 * | 11/2002 | Simoni | H03G 3/341 327/63 |
| 6,593,768 | B1 * | 7/2003 | Iyer | G06F 13/4086 326/30 |

(Continued)

FOREIGN PATENT DOCUMENTS

EP     1483651 B1 *  11/2006  ......... G06F 13/4077

OTHER PUBLICATIONS

Anderson et al., "Universal Serial Bus System Architecture," Mindshare, Inc. (2001), pp. 93-166.

(Continued)

*Primary Examiner* — Aurel Prifti
(74) *Attorney, Agent, or Firm* — Schwabe, Williamson & Wyatt, P.C.

(57) ABSTRACT

Apparatus for managing high speed Universal Serial Bus 2.0 (USB2) communications is presented. The apparatus may include a combination differential difference detector to receive first and second input signals, the combination differential difference detector to, in a first mode: sense a first voltage difference between the first and second input signals and output a squelch signal when the first voltage difference is less than or equal to a pre-defined value. The combination differential difference detector is to, in a second mode, sense a second voltage difference between the first and second input signals and output a disconnect signal when the second voltage difference is greater than or equal to a pre-defined value. Related methods may also be disclosed.

25 Claims, 8 Drawing Sheets

(56) References Cited

U.S. PATENT DOCUMENTS

| | | | | |
|---|---|---|---|---|
| 6,774,700 | B1* | 8/2004 | Wood | H04L 25/0276 327/108 |
| 7,120,408 | B2* | 10/2006 | Wood | H04L 25/085 455/218 |
| 7,282,965 | B2* | 10/2007 | Hatooka | H03K 5/19 327/74 |
| 7,411,421 | B1* | 8/2008 | Steinke | H03K 19/0175 326/83 |
| 7,831,223 | B2* | 11/2010 | Kawashima | H04L 1/0002 455/115.2 |
| 8,400,186 | B1* | 3/2013 | Wang | H03K 19/018578 326/83 |
| 8,536,894 | B1* | 9/2013 | Tan | H03K 19/018557 326/30 |
| 9,742,603 | B1* | 8/2017 | Bandi | H04L 7/10 |
| 9,832,006 | B1* | 11/2017 | Bandi | H04L 7/0008 |
| 2003/0185308 | A1* | 10/2003 | Schoenborn | G06F 13/4077 375/257 |
| 2005/0026584 | A1* | 2/2005 | Lewis | H03G 3/3068 455/245.1 |
| 2007/0241769 | A1* | 10/2007 | Song | G06F 13/4072 326/30 |
| 2010/0081406 | A1* | 4/2010 | Tan | G06F 1/3287 455/218 |
| 2010/0100200 | A1* | 4/2010 | Kim | G06F 13/4081 700/12 |
| 2011/0131356 | A1* | 6/2011 | Devam | G06F 13/426 710/105 |
| 2012/0015617 | A1* | 1/2012 | Srivastava | H04B 1/1027 455/218 |
| 2012/0079308 | A1* | 3/2012 | Sasaki | G06F 1/3253 713/340 |
| 2012/0317446 | A1* | 12/2012 | Jaramillo | G06F 11/221 714/43 |
| 2013/0029622 | A1* | 1/2013 | Zhan | H03G 3/344 455/218 |
| 2013/0251016 | A1* | 9/2013 | Yap | G06F 1/3253 375/224 |
| 2014/0006652 | A1* | 1/2014 | Chen | G06F 13/4282 710/16 |
| 2014/0006664 | A1* | 1/2014 | Chen | G06F 1/3253 710/106 |
| 2015/0227489 | A1* | 8/2015 | Chen | G06F 13/4291 710/313 |
| 2015/0269112 | A1* | 9/2015 | Hsueh | G06F 1/3287 710/106 |
| 2016/0103781 | A1* | 4/2016 | Lin | G06F 13/4282 375/139 |
| 2016/0162427 | A1* | 6/2016 | Kang | G06F 13/387 710/313 |
| 2016/0179648 | A1* | 6/2016 | Srivastava | G06F 13/4295 710/16 |
| 2016/0283423 | A1* | 9/2016 | Srivastava | G06F 11/3656 |
| 2016/0378154 | A1* | 12/2016 | Srivastava | G06F 13/42 713/300 |
| 2016/0378632 | A1* | 12/2016 | Srivastava | G06F 9/4411 714/5.1 |
| 2017/0123470 | A1* | 5/2017 | Srivastava | G06F 1/266 |
| 2017/0134215 | A1* | 5/2017 | Chini | H04L 41/0631 |
| 2017/0168979 | A1* | 6/2017 | Remple | G06F 13/4068 |
| 2017/0277249 | A1* | 9/2017 | Low | G06F 13/4022 |
| 2018/0189213 | A1* | 7/2018 | Bandi | G06F 15/7807 |
| 2018/0287771 | A1* | 10/2018 | Srivastava | H04L 25/20 |
| 2020/0106535 | A1* | 4/2020 | Bandi | H04B 17/24 |
| 2020/0272590 | A1* | 8/2020 | Maung | H03F 3/45475 |

OTHER PUBLICATIONS

"Universal Serial Bus Specification," Compaq Computer Corporation, Hewlett-Packard Company, Intel Corporation, Lucent Technologies Inc, Microsoft Corporation, NEC Corporation, Koninklijke Philips Electronics N.V., Apr. 27, 2000, pp. 25-82 and 239-296.

* cited by examiner

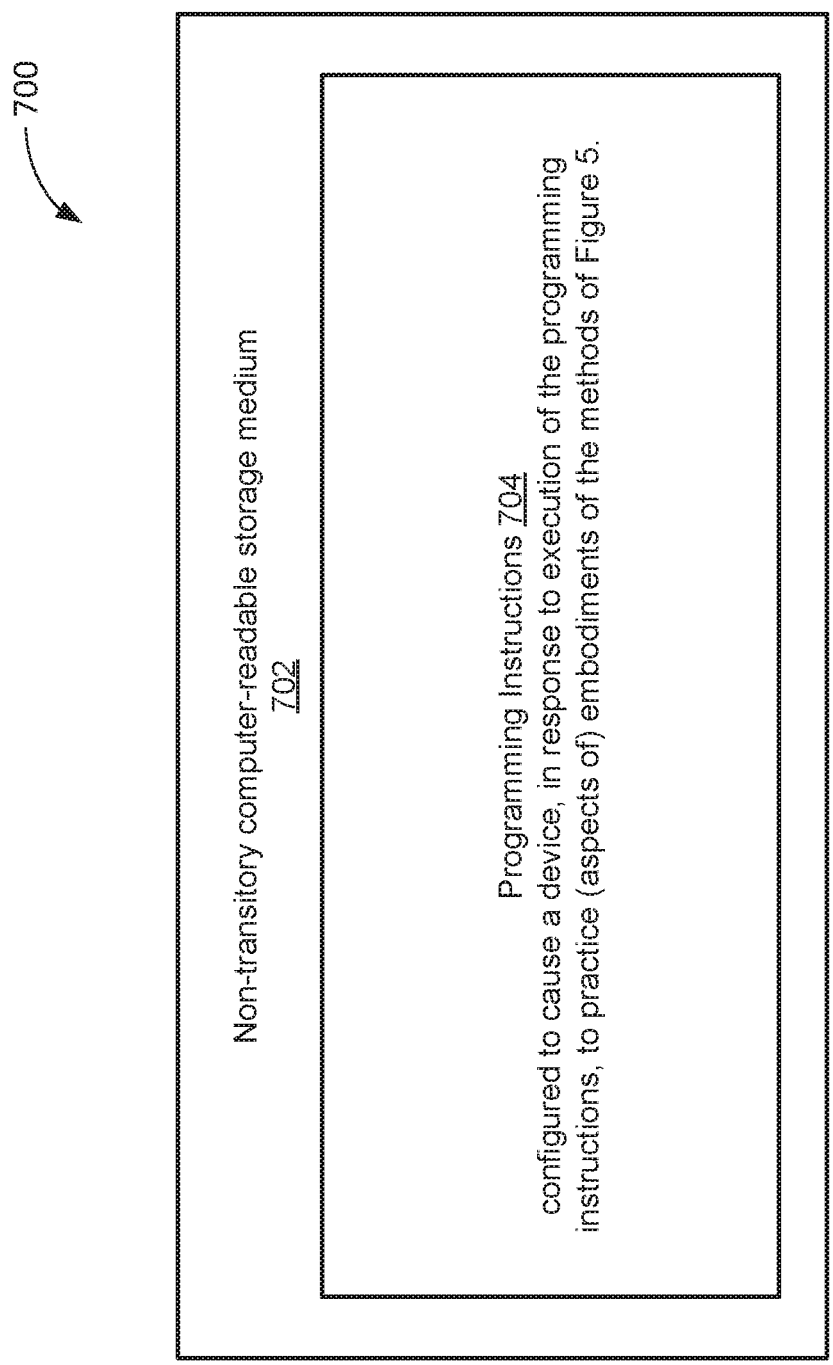

APPARATUS FOR UNIVERSAL SERIAL BUS 2.0 (USB2) COMBINED HIGH SPEED SQUELCH AND DISCONNECT DETECTION

TECHNICAL FIELD

The present disclosure relates to the field of Universal Serial Bus 2.0 (USB2) communications, in particular, to a system for high speed connect and disconnect for USB2.

BACKGROUND

Present day Universal Serial Bus (USB) devices that communicate with a host over USB include USB printers, scanners, digital cameras, storage devices, card readers, and the like. USB based systems may require that a USB host controller be present in the host system, and that the operating system (OS) of the host system support USB and USB Mass Storage Class Devices. USB devices may communicate over the USB bus at low-speed (LS), full-speed (FS), or high-speed (HS). A connection between a USB device and a host may be established via a four-wire interface that includes a power line, a ground line, and a pair of data line, differential voltage plus (D+) and differential voltage minus (D−), or for the case of USB On-The-Go (OTG), a fifth line named ID (identification pin) may be added. When a USB device connects to the host, the USB device may first pull a D+ line high (or the D− line if the device is a low speed device) using a pull up resistor on the D+ line when connecting as FS (Full Speed) mode. The host may respond by resetting the USB device. If the USB device is a high-speed USB device, the USB device may "chirp" by driving the D− line high during the reset. The host may respond to the "chirp" by alternately driving the D+ and D− lines high. The USB device may then electronically remove the pull up resistor and continue communicating at high speed. When disconnecting, full-speed devices may remove the pull up resistor from the D+ line (i.e., "tri-state" the line), while high-speed USB devices may tri-state both the D+ and D− lines.

The USB2 specification was released in April 2000, and was ratified by the USB Implementers Forum (USB-IF) at the end of 2001. USB2 is the result of an initiative to develop a higher data transfer rate, with the resulting specification achieving 480 megabits per second (Mbit)/s, a 40-fold increase over the original USB1.1 specification. The USB2 specification defines a mechanism to detect differential line voltage using differential difference receiver detectors.

In high-speed USB2 transmissions, data may be sent by steering a current of 17.78 milliamperes (mA) (derived from the positive supply) into either the D+ or the D− line. As noted above, in USB2, the twisted pair of D+ and D− lines carry a differential data signal. This results in a voltage of 400 millivolts (mV) on the line being fed with current. The differential state of the line may be detected at the receiving end by a differential receiver. With this arrangement, data sent at 480 Mb/s may be reliably received.

Squelch detection is performed while a USB device is in a receive mode. If the received signal strength becomes too low (<=100 mV), the original signal is assumed to no longer be there, and the receiving device quiets, or squelches the line or ignore the data packets. Disconnect detection, on the other hand, occurs when a USB2 high speed device is in a transmit mode. Here the device seeks to determine if the intended recipient of the transmitted data has disconnected, and is no longer receiving by USB2 peripherals.

BRIEF DESCRIPTION OF THE DRAWINGS

Embodiments will readily be understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 7 illustrates an example computer-readable storage medium having instructions configured to practice methods described herein, in accordance with various embodiments.

DETAILED DESCRIPTION

Figure 1:
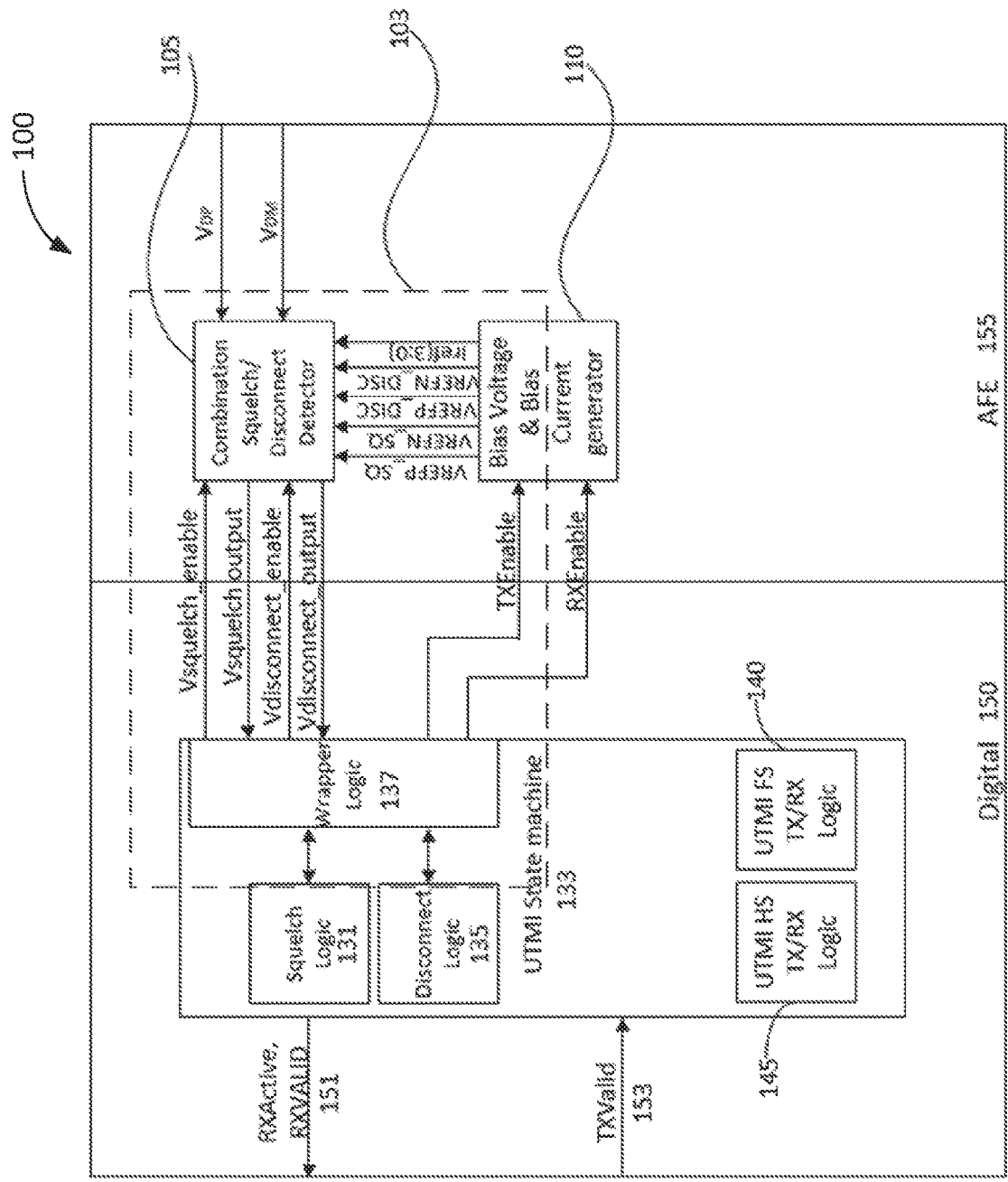
FIG. 1 depicts a top level block diagram of a combination squelch and disconnect detector according to various embodiments.

In embodiments, a combination detector may be provided, which is more robust than prior known solutions for sensing both squelch and disconnect modes in a USB2 transceiver. In embodiments, such a combination detector architecture may be configured on the fly for both squelch detection as well as for disconnect detection without violating USB2 protocol (e.g., during on-the fly transitions from squelch mode to disconnect mode, and disconnect mode to connect mode).

In embodiments, a ~TXValid (Transmission Valid signal) may be used as an indication of generating internal signals for disconnect (transmit) mode, and an RXActive (Receiver Active signal) may be used to generate internal biases for squelch detection during receive mode. In embodiments, a save/restore configuration may be used for each mode, which may then be loaded prior to each high speed sending operation.

In embodiments, a Start of File-End of Packet (SOF-EOP) count based digital filtering technique may be performed after completing digital filtering during sampling window time. Further, in embodiments, internal calibration for both common mode adjustment as well as for offset may be implemented, which provides for a robust sensing scheme.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "link" or "communications link" as used herein may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

As used hereinafter, including the claims, the term "circuitry", including "communications circuitry" or "supporting circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality and/or any combination of software, firmware or hardware. In some embodiments, the circuitry may implement, or functions associated with the circuitry may be implemented by, one or more software or firmware modules.

As used hereinafter, including the claims, the terms "squelch" or "squelch mode" are understood to be synonymous with "connect" and "connect mode", respectively, and "connect mode" may be referred to as "receive mode." Similarly, the term "disconnect mode" is understood to be synonymous with "transmit mode." It is understood that squelch detection occurs while a USB2 device is receiving data, and disconnect detection occurs while a USB2 device is transmitting data.

As noted above, both squelch and disconnect detection is needed for USB2 devices. Conventionally, two separate high-speed differential receiver (Rx) detectors are used for each of squelch detection and disconnect detection. A first detector, a squelch detector, is for detecting a receiver differential line-state during receiving mode for valid high-speed data transfers. If it finds a differential voltage greater than or equal to 150 millivolts (mV) it outputs a valid/un-squelch, and if it finds a differential voltage less than or equal to 100 mV it outputs a squelch. A squelch detector is also sometimes known as a "transmission envelope detector." As noted, it produces a "squelch" signal if there is less than 100 mV between the data lines, which means that whatever data is on the line should not be consumed by the controller.

In addition to the squelch detector, conventionally, a second high speed differential detector is used to detect a far end termination while transmitting a differential high speed data packet over the VDP/VDM lines by detecting a differential voltage condition. A disconnect detector may also be known as a "differential envelope detector." It detects if the far end (receiving the data being transmitted) has been unplugged, because if the far end terminating resistors are not present, the differential voltage between the two lines will double, to about 800 mV. According to the USB2 standard, a disconnect state, or differential voltage condition, is one where the two voltage lines differential plus (VDP) and differential minus (VDM) differ by a voltage greater than or equal to 625 mV, and a connect state is one where the differential voltage is less than or equal to 525 mV.

There are several difficulties with the conventional design. First, the squelch and disconnect detectors generally each use a different architecture for sensing different voltages during connect and checking for disconnect modes, but need to follow, and thus be designed for, a wider common mode voltage requirement and require each detector to meet the command mode requirement differently, which is tough to achieve for design targeting for a low power supply.

In a related conventional approach, the same architecture may be used for each of the two detectors. However, in this case the common mode must be adjusted for each sensing mode (i.e., high speed connect (squelch) and high speed disconnect) so that the same differential voltage can be sensed by each detector. This approach suffers wider variation—across chip to chip, process and noise—during disconnect mode, as a smaller offset or noise is amplified due to common mode gain, which results in a reduced margin for connect and disconnect. In disconnect sensing there is only a 100 mV margin, across process, voltage and temperature (PVT), in a noisy environment (here P refers to silicon process variation from slow to fast, V refers to supply voltage (minimum to maximum voltage usually, +/−5-10%), and T refers to temperature (−40° Celsius (° C.) to 125° C.)). The designs need to be guaranteed as to functionality and performance across these PVT variations. This variation problem may result in several false connect and disconnect issues, and slight variations in a noisy environment may result in difficulty in meeting the specification for receiver detector and disconnect detector.

Thus, conventional approaches to squelch and disconnect detector design have not been fully satisfactory.

As noted above, in embodiments, a combination detector may be provided, which is more robust than prior known solutions for sensing both squelch and disconnect modes in a USB transceiver. FIG. 1 depicts a high level diagram of an example USB2 combination detector architecture according to various embodiments. Key components of the architecture are provided within box 103, shown with a dashed outline. With reference to FIG. 1, in embodiments, the architecture may include a digital portion 150 and an analog front end (AFE) portion 255.

In embodiments, the digital portion may include a USB2 Transceiver Macrocell Interface (UTMI) state machine 133. UTMI state machine 133 may include squelch logic 131, disconnect logic 135, wrapper logic 137, UTMI HS transmit/receive logic 145, and UTMI FS transmit/receive logic 140. It is noted that as regards USB, "full speed" is a lower data rate communications mode that was part of USB1.1. In embodiments, as noted above, UTMI state machine 133 may receive RXActive signals 151, and may send TXValid signals 253.

Continuing with reference to FIG. 1, on the AFE 155 side, there may be provided a combination squelch/disconnect detector 105. In embodiments, Combination Squelch/Disconnect Detector 105 may take as inputs the two USB signal lines VDP and VDM, as shown. In embodiments, this combination detector provides the functionality of both a squelch a detector and a disconnect detector of conventional systems. AFE 155 may also, in embodiments, include Bias Voltage And Bias Current Generator 110. Wrapper Logic 137 may be responsible for initiating training, for calibration for CM adjustment and also for enabling filtering scheme, as well as for on the fly mode change configurations for squelch and disconnect mode.

Figure 2:
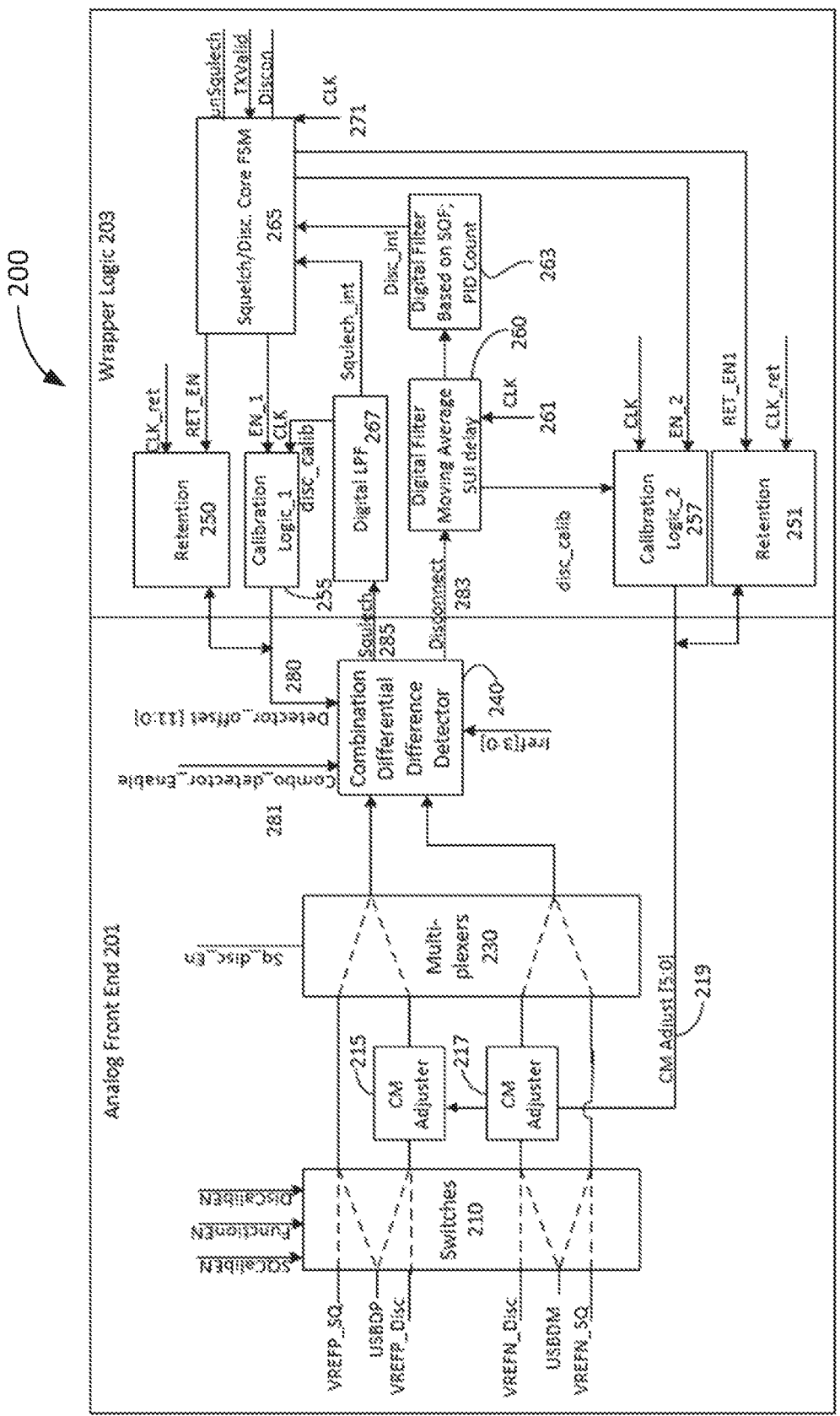
FIG. 2 depicts a detailed block diagram according to various embodiments.

FIG. 2 depicts a detailed block diagram, at a micro-architecture level, of the key components 200 of the example architecture of FIG. 1, i.e., those shown in box 103 of FIG. 1. With reference to FIG. 2, there is shown AFE 201, and Wrapper Logic 203. These blocks correspond to AFE 155 and Wrapper Logic 137, respectively, of FIG. 1, described above.

Continuing with reference to FIG. 2, in embodiments, AFE 201 may include the following key blocks: Combination Differential Difference Detector 340, which is a differential difference detector used for detecting voltage differences on the input lines and also used for sending both squelch and disconnect mode output signals. Thus, the squelch and disconnect signals are shown here as exiting the right side of Combination Differential Difference Detector 340. Also included in AFE 201 may be CM adjuster blocks 215 and 217.

It is noted that a CM adjuster may be used to adjust common mode so that a single combination squelch and disconnect detector may be usable. It is noted that disconnect mode needs a high common mode, while squelch mode uses a lower common mode. In embodiments, CM adjuster blocks may adjust the CM in such a way that one (combination) detector can meet both requirements. Thus, CM adjuster blocks 215 and 217 are both the same, but may be respectively used for USB Differential Plus (USBDP) and USB Differential Minus (USBDM) voltage lines separately. Alternatively, other embodiments may have an option where a single CM adjuster may handle both USBDP and USBDM blocks and provide both CM adjusted outputs.

In embodiments, CM adjuster blocks 215 and 217 may be used during calibration mode and disconnect detect mode, as described below in connection with FIG. 4. It is noted that CM adjusters 215 and 217 may be controlled by Finite State Machine (FSM) logic 265 and may also be controlled by mini-state machine calibration logic_2 257, provided as part of Wrapper Logic 203.

Continuing with reference to FIG. 2, in embodiments, AFE 201 may also have Switches 210 and Multiplexers 230. These may be controlled by FSM logic 265 during calibration modes 1 and 2 (described more fully below) for selecting an input reference for each mode, as well as for selection of a CM adjustment based on the relevant mode. It is also noted that once obtained, as also described in connection with FIG. 4, FSM Logic 265 may load the appropriate configuration required for each mode.

Continuing further with reference to FIG. 2, in embodiments, Wrapper Logic 203 may be responsible for initiating calibration, detections, filtering, SOF-EOP counting and filtering, and Save/Load configurations for each mode (e.g., squelch and disconnect modes). In embodiments, Calibration Logic_1 255 may be responsible for calibration of Combination Differential Difference Detector 240 during boot mode, and may also be tasked with saving the configurations and loading them during squelch mode. In embodiments, Calibration Logic 2 257 may be responsible for calibrating common mode adjustment after Calibration Logic 1 255 has completed its calibration. In embodiments, this latter calibration performed by Calibration Logic 2 may help reduce the effect of CM variation. As noted, following calibration 2, Wrapper Logic 203 may then save the configuration and load it during disconnect mode, as shown at block 430 of FIG. 4.

Finally, in embodiments, two kinds of filtering schemes may be used, as shown in blocks 261 and 263. These may both involve digital filtering in squelch detection mode. The first filtering scheme, shown at block 261, may involve moving average of 5 Unit Intervals (UIs) (this value may be programmable) filtering during a disconnect sampling window; i.e., the output, out[n], may be set equal to 1 if: out[n] & out[n−1] & out[n−2] & out[n−3] & out[n−4]=1. A second filtering scheme, shown at block 263, may involve filtering based on counting SOF-EOP occurrences. Because the USB2 protocol allows for three retries, in embodiments the output may be measured. If the output detects a disconnect for the last two SOFs then the output will be valid and a disconnect may be declared, i.e., output[n]=1 if output[SOF[n]] & output[SOF[n−1]]=1.

As shown in FIG. 2, in embodiments, FSM Logic 265 may be responsible for initiating calibration_1 and calibration_2 and storing their configurations. Thus, FSM Logic 265 may have control lines EN_1 and EN_2 respectively, which may input to Calibration Logic_1 and Calibration Logic_2. FSM Logic 265 may also use TX Valid to generate internal biases and detect a packet identifier (PID) (the USB2 protocol allows a controller to send a SOF-EOP during this time window, and then check whether a high speed device is still connected), and then later load this configuration during each mode. In embodiments, FSM logic 265 may also be responsible for generating control signals for each mode.

Figure 3:
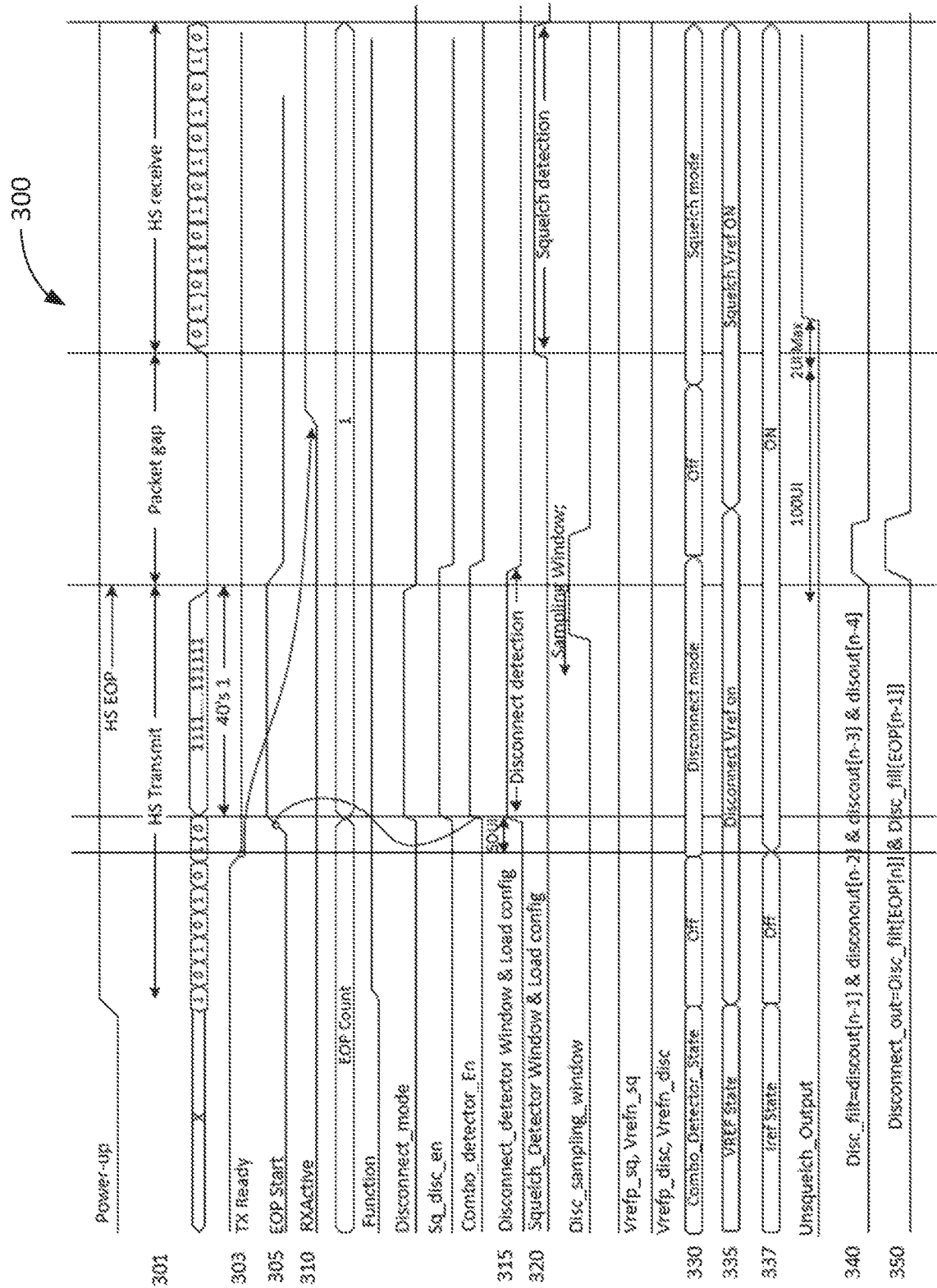
FIG. 3 depicts a timing diagram for a combination detector according to various embodiments.

FIG. 3 illustrates a detailed timing diagram for finite state machine (FSM) logic. In embodiments, the FSM logic may generate internal biases and load configurations as may be required for each sensing mode. In embodiments, FSM logic may be provided in UTMI State Machine 133 of FIG. 1. As noted, FSM logic may also generate a window for comparisons, detections and loads of configuration in each mode. (It is noted that from a protocol and system point of view a 5 meter (m) cable reflection may reach a host after 52 nanoseconds (ns), and the SOF-EOF window is 80 ns. Thus, a window of 28 ns remains for detection. Because a USB host cannot know whether a cable is 1 m or 5 m, for example, reliable detection may only occur in a last 10 Unit Interval (UI) window, which is approximately 20 ns.)

With reference to FIG. 3, and the various signal lines shown therein (labelled by index numbers on the left side of FIG. 3), the timing diagram is divided into three segments, as shown on status line 301. These include, starting at the far left of the figure, a HS transmit portion, followed by a packet gap, and then a HS receive portion. It is noted that in FIG. 3, the time axis moves from left to right. As can be seen with reference to TX Ready signal 303 and RX Active signal 310, initially the device of the example shown in FIG. 3 is in a transmit mode, then TX Ready 303 goes low, EOP Start 305 goes high, and an EOP sequence may be sent. It is noted that TX Ready 303 gives an indication of when the UTMI state-machine is ready to consume data, whereas TX Valid gives an indication of valid data.

Continuing with reference to FIG. 3, the sending of the EOP sequence may be followed by a packet gap, as shown. Towards the end of the packet gap, RX Active 310 goes high and the device enters a HS receive mode. It is further noted that Combo_Detector_State 330 shows that the example device is in disconnect mode at the end of the transmission, and then switches to a squelch mode during the reception, as expected. As is seen in FIG. 3, signal lines 315 and 320, which relate to disconnect and squelch detection, echo the state of the device as shown by Combo_Detector_State 330. Signal lines 340 and 350, which relate to the two types of filtering described above in connection with blocks 261 and 263 of FIG. 2, respectively, as shown, go high just following the end of the HS Transmit portion of the timing diagram. Finally, voltage reference VREF State 335 shows that Disconnect Vref is on during the transmit phase, and, as expected, midway through the packet gap, switches to Squelch Vref on, and Squelch Vref remains on through the completion of the receive phase. Current reference indicator Iref State remains on while the device is in disconnect mode, through the packet gap, and through the device's squelch mode, as tracked by Combo_Detector_State 330.

Figure 4:
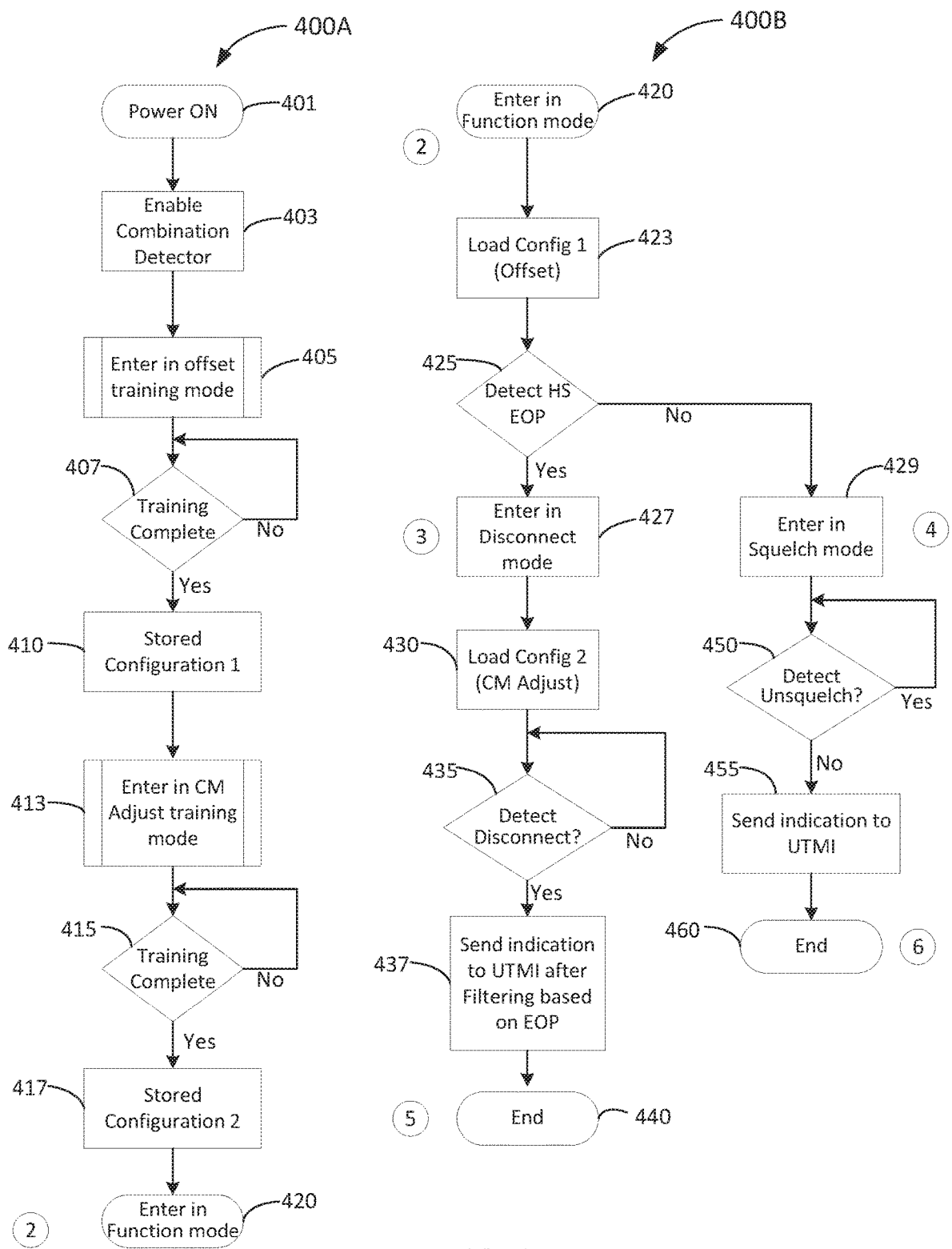
FIG. 4 depicts an overview of the operational flow of processes for a combination detector according to various embodiments.

FIG. 4 depicts an overview of the operational flow of processes for a combination detector according to various embodiments. With reference to FIG. 4, there are two fundamental processes shown. A first, process 400A, is a calibration process. The second, process 400B, which then branches into sub-processes "3" and "4", is an operational process.

With reference to process 400A, as illustrated, process 400A may include operations performed at blocks 401-420. The operations may be performed e.g., by the various elements of apparatus 100, including the elements of Wrapper Logic 203 and AFE 201, which are part of key elements 200, as earlier described with reference to FIGS. 1 and 2, respectively. In embodiments, process 400A may include two calibration sub-processes, namely, a first offset calibration and a second CM adjustment calibration, of a combination squelch/disconnect detector according to various embodiments.

Process 400A may begin at block 401. At block 401 the device may power on. From block 401 process 400A may proceed to block 403, where the combination detector may be enabled. From block 403 process 400A may proceed to block 405, where, in embodiments, an offset training mode may be entered. From block 405 process 400A may proceed to query block 407, where it may be queried whether the offset training has been completed. If the response is "No" at 407, then process 400A may return to query block 407, and may continue in such a loop, until training has been completed. However, if the response is "Yes" at 407, then process 400A may proceed to block 410, where an offset configuration for the device, here termed "Configuration 1", may be stored.

From block 410 process 400A may proceed to block 413, where, in embodiments, a Common Mode (CM) training mode may be entered. From block 413, process 400A may proceed to query block 415, where it may be queried whether the common mode training has been completed. If the response is "No" at 415, then process 400A may return to query block 415, and may continue in such a loop, until the common mode training has been completed. However, if the response is "Yes" at 415, then process 400A may proceed to block 417, where a common mode configuration for the device, here termed "Configuration 2", may be stored.

From block 417, process 400A may proceed to block 420, where it may enter a function mode (as opposed to training or calibration modes), which is where process 400B begins. It is noted that process 400B actually includes the device operating in three modes, namely, functional mode, which includes blocks 420-425, provided between the points of the chart labeled with circled numerals "2" and "3", disconnect mode, which includes blocks 427-440, provided between the portions of the figure labeled with circled numerals "3" and "5", and receive mode, which includes blocks 429-460, provided between the portions of the figure labeled with circled numerals "4" to "6"

Continuing with reference to FIG. 4, process 400B may begin at block 420, where the functional mode is entered, where actual USB2 signal status detections are performed. From block 420 process 400B may proceed to block 423, where the offset configuration, "Configuration 1", obtained and stored at block 410 of process 400A, may be loaded. From block 423 process 400B may proceed to query block 425, where it may be queried whether a high-speed EOP has been detected. The response to this query may, in embodiments, determine whether process 500B enters disconnect mode or receive mode. If "Yes" at 425, an EOP has been received, and process 400B may proceed to block 427, to operate in the disconnect mode of the device. However, if "No" at 425, then process 400B may move to block 429, to operate in the receive mode of the device, described below.

Considering now the blocks involved in disconnect mode, from block 427 process 400B may proceed to block 430, where the CM adjust configuration, "Configuration 2", which was obtained and stored at block 417 of process 400A, may be loaded. From block 430 process 400B may proceed to query block 435, where it may be queried whether a disconnect has been detected. If the response is "No" at block 435, then process 400B may return to query block 435, and may continue in such a loop, until a disconnect has actually been detected. However, if the response is "Yes" at 435, then process 400B may proceed to block 437, where an indication may be sent to UTMI, following filtering based on EOP. From block 437, process 400B may proceed to block 440, where process 400B may terminate.

Returning now to the blocks involved in receive (squelch) mode, process 400B, upon having received a "No" response at block 425, may proceed to block 429, where the device may enter squelch mode. From block 429, process 400B may proceed to query block 450, where it may be queried whether transmission of data form a remote USB2 host (or an "unsquelch" state) has been detected. If "Yes" at 450, then data is still being received from a remote transmitting host, and process 400B may return to query block 450, and may continue in such a loop, while continuing to receive data, until a disconnect has been detected. However, if the response to the query at block 450 is "No", and thus data is no longer being received from the remote transmitting device, then process 400B may proceed to block 455, where an indication may be sent to UTMI. From block 450, process 500B may proceed to block 460, where process 500B may terminate.

Thus, as shown in FIG. 4, in embodiments, during functional mode (starting at block 420) the Configuration 1 (offset) calibration may be loaded for the combination detector (block 423). This depends on PID detection and TX Valid, as well as detection mode being enabled. In embodiments, during disconnect mode (shown as segment 3-5 of process 400B, blocks 427 through 440, in flow), Configuration 2 (CM adjust) calibration is also loaded and an output of comparison after SOF-EOP count filtering is sent to UTMI Logic, as shown at block 437. In embodiments, during receive (squelch) mode (shown as segment 4-6 of process 400B, blocks 429 through 460), only Configuration 1 (offset) calibration is loaded and the process depends on a detection output being sent to UTMI logic, as shown in block 455.

Figure 5A:
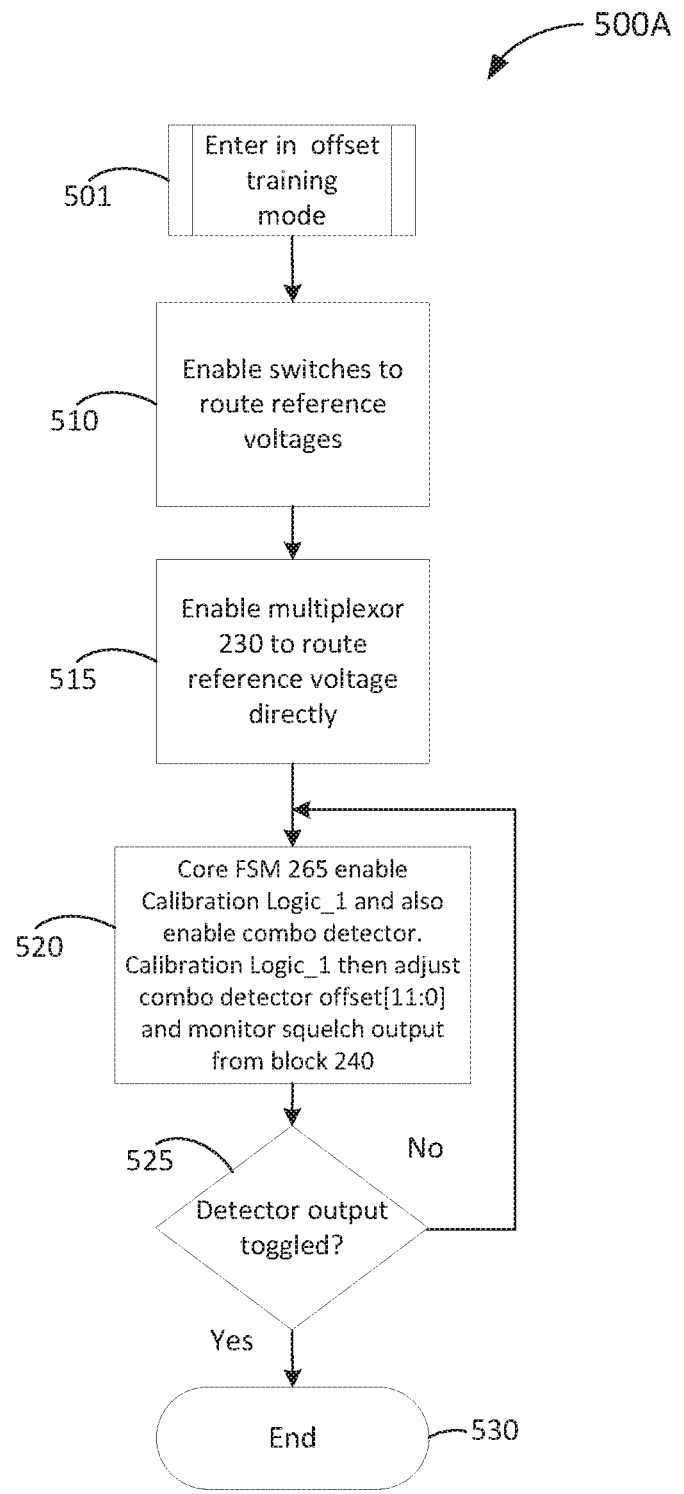
FIG. 5A depicts an overview of the operational flow of a process for an offset training mode according to various embodiments.
Figure 5B:
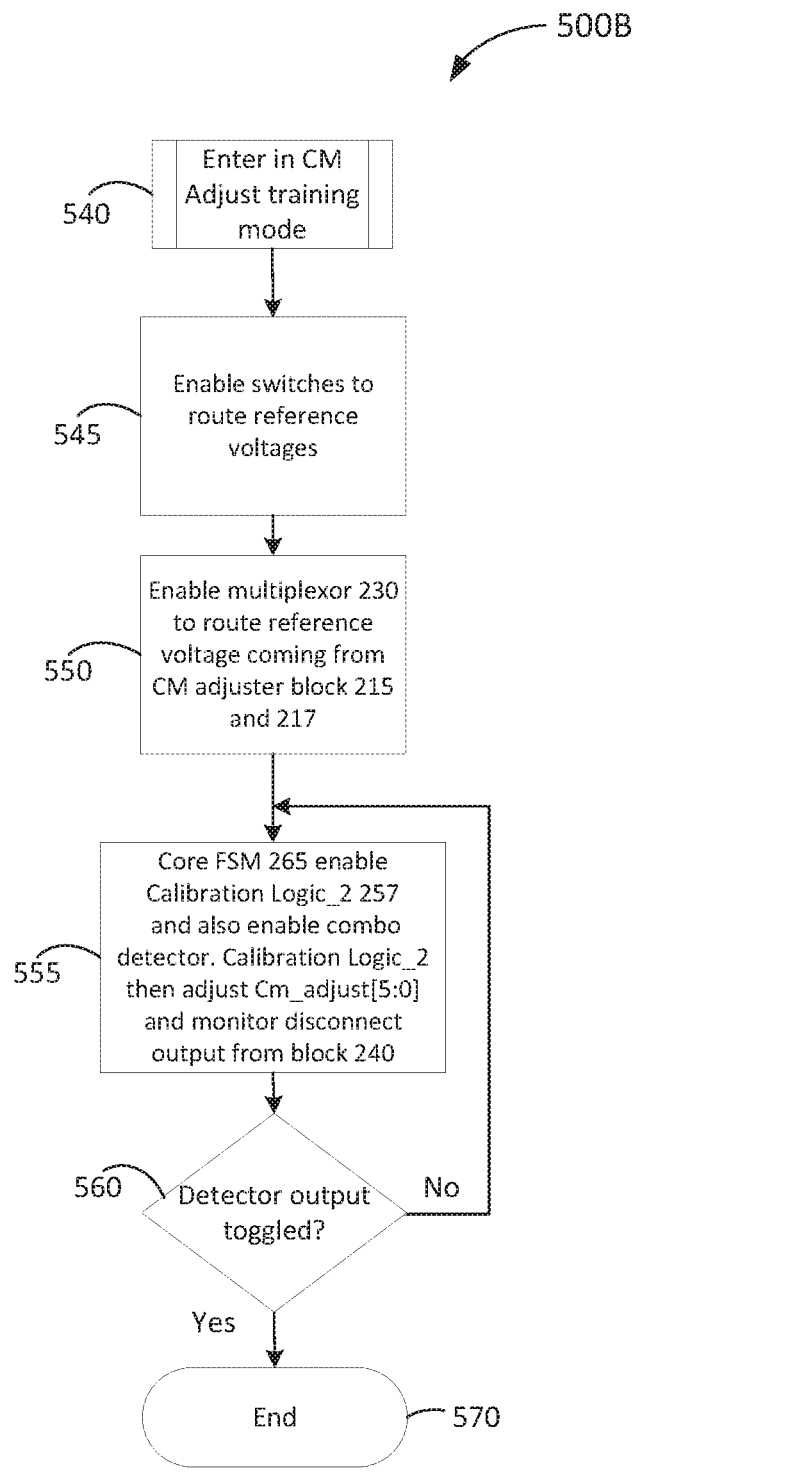
FIG. 5B depicts an overview of the operational flow of a process for a common mode adjust training mode according to various embodiments.

As shown in FIG. 4, in process 400A there are two training modes, one, offset training, occurring first, then followed by the other, CM adjust training. In process 400A these training processes are shown, but not detailed. FIGS. 5A and 5B provide greater details of these sub processes of process 400A. The processes shown in FIGS. 5A and 5B relate to various elements of the detailed block diagram for a combination envelope detector shown in FIG. 2, and therefore refer to various elements of FIG. 2 which perform, or are involved with, the processes shown in FIGS. 5A and 5B.

FIG. 5A depicts an overview of the operational flow of a process for an offset training mode for a combination squelch/disconnect detector according to various embodiments. With reference to FIG. 5A, Process 500A may begin at block 501, where the device may enter an offset training mode. From block 501 process 500A may proceed to block 510, where the switches (shown at FIG. 2, element 210) may be enabled to route reference voltages. From block 510, process 500A may proceed to block 515, where a multiplexor (shown at FIG. 2, element 230) may be enabled to directly route a reference voltage.

Continuing with reference to FIG. 5A, in embodiments, from block 515 process 500A may proceed to block 520, where the Squelch/Disconnect Core FSM Logic (shown at FIG. 2, element 265) may enable Calibration Logic_1 (255 in FIG. 2) as well as the Combination Differential Difference Detector (240 in FIG. 2, via input 281). Calibration Logic_1 may also adjust Detector_Offset [11:0], as shown at 280 in FIG. 2, and monitor squelch output 285 of the Combination Differential Difference Detector. From block 520 process 500A may proceed to query block 525, where it may be determined whether the output of the Combination Differential Difference Detector has been toggled. If "Yes", then process 500A may proceed to block 530, where offset mode training, and thus process 500A, may terminate. This is equivalent to a "Yes" at block 407 of FIG. 4, as described above. If "No" at query block 525, then process 500A may return once again to block 520 in another iteration of this loop.

FIG. 5B depicts an overview of the operational flow of a process for a common mode adjust training mode for a combination squelch/disconnect detector according to various embodiments. With reference to FIG. 5B, Process 500B may begin at block 540, where the device may enter an offset training mode. From block 540 process 500B may proceed to block 545, where the switches (shown at FIG. 2, element 210) may be enabled to route reference voltages. From block 545, process 500B may proceed to block 550, where a multiplexor (shown at FIG. 2, element 230) may be enabled to directly route a reference voltage coming from CM Adjusters (215 and 217 in FIG. 2).

Continuing with reference to FIG. 5B, from block 550 process 500B may proceed to block 555, where the Squelch/Disconnect Core FSM Logic (shown at FIG. 2, element 265) may enable Calibration Logic_2 (257 in FIG. 2) as well as the Combination Differential Difference Detector (240 in FIG. 2, via input 281). Calibration Logic_2 may also adjust CM_Adjust [5:0], as shown at 219 in FIG. 2, and monitor disconnect 283 of the Combination Differential Difference Detector. From block 555 process 500B may proceed to query block 560, where it may be determined whether the output of the Combination Differential Difference Detector has been toggled. If the response is "Yes", then process 500B may proceed to block 570, where CM adjust training mode, and thus process 500B, may terminate. This is equivalent to a "Yes" at block 415 of FIG. 4, as described above. If, on the other hand, a "No" is the response to query block 560, then process 500B may return once again to block 555 in another iteration of this loop.

Figure 6:
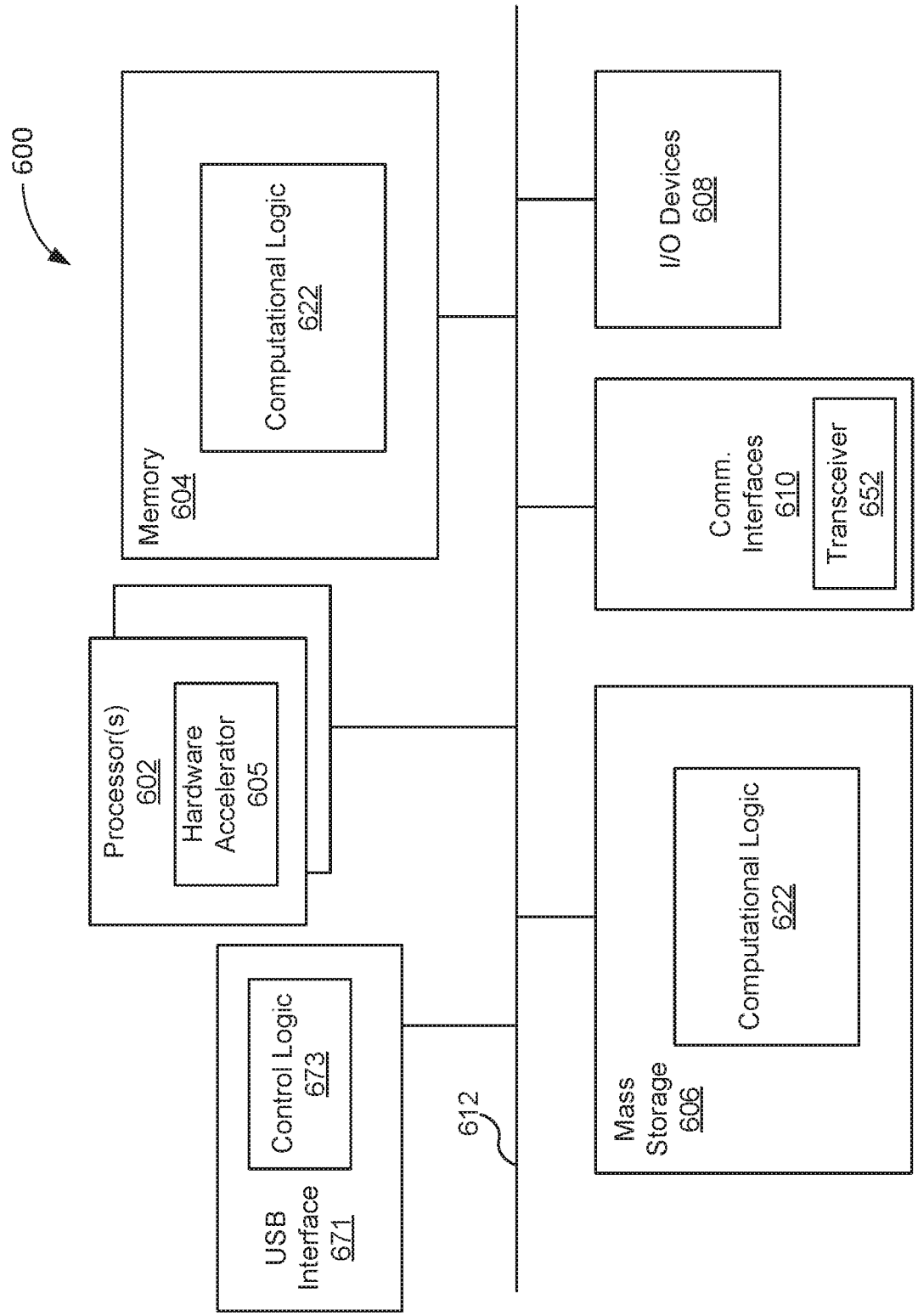
FIG. 6 illustrates a block diagram of a computer device suitable for practicing aspects of the present disclosure, in accordance with various embodiments.

Referring now to FIG. 6, wherein a block diagram of a computer device suitable for practicing the present disclosure, in accordance with various embodiments, is illustrated. As shown, computer device 600 may include one or more processors 602, memory controller 603, and system memory 604. Each processor 602 may include one or more processor cores and/or hardware accelerator 605. An example of hardware accelerator 605 may include, but is not limited to, programmed field programmable gate arrays (FPGA). Memory controller 603 may be any one of a number of memory controllers known in the art. System memory 604 may include any known volatile or non-volatile memory. Computer device 600 may also include a USB2.0 apparatus 671, such as described herein, having a UTMI state machine 673, similar to that shown in FIG. 2.

Additionally, computer device 600 may include mass storage device(s) 606 (such as solid state drives), input/output device interface 608 (to interface with various input/output devices, such as, mouse, cursor control, display device (including touch sensitive screen), and so forth) and communication interfaces 610 (such as network interface cards, modems and so forth). In embodiments, communication interfaces 610 may support wired or wireless communication, including near field communication. The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage device(s) 606 may be employed to store a working copy and a permanent copy of the executable code of the programming instructions of an operating system, one or more applications, UTMI State Machine 133, Wrapper Logic 137, Squelch Logic 131, Disconnect Logic 135, UTMI HS TX/RX Logic 145, and UTMI FS TX/RX Logic 140, all as shown in FIG. 1, Squelch/Disconnect Core FSM 265, Calibration Logic_1 255, Calibration Logic_2 257, and Digital Filters 267, 261, and 263, all as shown in FIG. 2, collectively referred to as computing logic 622. Further, UTMI State Machine 133, Wrapper Logic 137, Squelch Logic 131, Disconnect Logic 135, UTMI HS TX/RX Logic 145, and UTMI FS TX/RX Logic 140, all as shown in FIG. 1, and Squelch/Disconnect Core FSM 265, Calibration Logic_1 255, Calibration Logic_2 257, and Digital Filters 267, 261, and 263, all as shown in FIG. 2, may be configured to practice (aspects of) processes 400A and 400B of FIG. 4, respectively, and processes 500A and 500B of FIGS. 5A and 5B, respectively. The programming instructions may comprise assembler instructions supported by processor(s) 602 or high-level languages, such as, for example, C, that can be compiled into such instructions. In embodiments, some of computing logic may be implemented in hardware accelerator 605.

The permanent copy of the executable code of the programming instructions or the bit streams for configuring hardware accelerator 605 may be placed into permanent mass storage device(s) 606 in the factory, or in the field, through, for example, a distribution medium (not shown), such as a compact disc (CD), or through communication interface 610 (from a distribution server (not shown)).

The number, capability and/or capacity of these elements 610-612 may vary, depending on the intended use of example computer device 600, e.g., whether example computer device 600 is a smartphone, tablet, ultrabook, a laptop, a server, a set-top box, a game console, a camera, and so forth. The constitutions of these elements 610-612 are otherwise known, and accordingly will not be further described.

FIG. 7 illustrates an example computer-readable storage medium having instructions configured to implement all (or portion of) UTMI State Machine 133, Wrapper Logic 137, Squelch Logic 131, Disconnect Logic 135, UTMI HS TX/RX Logic 145, and UTMI FS TX/RX Logic 140, all as shown in FIG. 1, and Squelch/Disconnect Core FSM 265, Calibration Logic_1 255, Calibration Logic_2 257, and Digital Filters 267, 261, and 263, all as shown in FIG. 2, and/or practice (aspects of) processes 400A and 400B of FIG. 4, respectively, and processes 500A and 500B of FIGS. 5A and 5B, respectively, earlier described, in accordance with various embodiments. As illustrated, computer-readable storage medium 702 may include the executable code of a number of programming instructions or bit streams 704. Executable code of programming instructions (or bit streams) 704 may be configured to enable a device, e.g., computer device 600, in response to execution of the executable code/programming instructions (or operation of an encoded hardware accelerator 605), to perform (aspects of) processes 400A and 400B of FIG. 4, respectively, and processes 500A and 500B of FIGS. 5A and 5B, respectively. In alternate embodiments, executable code/programming instructions/bit streams 704 may be disposed on multiple non-transitory computer-readable storage medium 702 instead. In embodiments, computer-readable storage medium 702 may be non-transitory. In still other embodiments, executable code/programming instructions 704 may be encoded in transitory computer readable medium, such as signals.

Referring back to FIG. 6, for one embodiment, at least one of processors 602 may be packaged together with a computer-readable storage medium having some or all of computing logic 622 (in lieu of storing in system memory 604 and/or mass storage device 606) configured to practice all or selected ones of the operations earlier described with references to FIG. 5. For one embodiment, at least one of processors 602 may be packaged together with a computer-readable storage medium having some or all of computing logic 622 to form a System in Package (SiP). For one embodiment, at least one of processors 602 may be integrated on the same die with a computer-readable storage medium having some or all of computing logic 622. For one embodiment, at least one of processors 602 may be packaged together with a computer-readable storage medium having some or all of computing logic 622 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus, various embodiments of the invention provide several benefits over prior art approaches such as were described in connection with FIG. 1. These include the following. First, a robust solution that performs better across PVT and in noisy environments. CM adjustment helps in reducing detection variation which provide significant margin across chip to chip variation.

Second, significant on chip area savings. Combined detector systems according to various embodiments may realize a nearly 8% of the Ethernet Physical Layer (PHY) and 48% of the high speed receiver area reduction as compared to the prior art architecture shown in FIG. 1, where the two detectors use a different architecture.

Third, power savings. In embodiments, a savings of nearly 1 milliwatt (mW) per 1× port active power for mobile segment and nearly 10 mW active power for client segment where a 10× ports configuration is used, may be realized (where "x" refers to the number of USB lanes or ports, and thus "10×" refers to 10 USB ports). Finally, less validation effort. Combined detector systems according to various embodiments offer significant savings in post-silicon validation efforts.

EXAMPLES

Example 1 may include an apparatus for managing high speed Universal Serial Bus (USB2) communications, comprising: a combination differential difference detector to receive first and second input signals, the combination differential difference detector to, in a first mode: sense a first voltage difference between the first and second input signals and output a squelch signal when the first voltage difference is less than or equal to a pre-defined value; and to, in a second mode: sense a second voltage difference between the first and second input signals and output a disconnect signal when the second voltage difference is greater than or equal to a pre-defined value. The apparatus may further include control logic coupled to the combination differential difference detector to enable either the first mode or the second mode; and a bias voltage and bias current generator, coupled to each of the combination differential difference detector and the control logic, to provide a reference current and reference voltages to the combination differential difference detector for each of the first and second modes.

Example 2 may include the apparatus of example 1, and/or some other examples herein, wherein, in the first mode, a squelch signal is output if the first voltage difference is <=100 millivolts (mV).

Example 3 may include the apparatus of example 1, and/or some other examples herein, wherein, in the second mode, a disconnect signal is output if the second voltage is >=625 mV.

Example 4 may include the apparatus of any one of examples 1-3, and/or some other examples herein, wherein the control logic is further to receive a USB2 transmit valid signal and, based upon the transmit valid signal, generate internal signals for the second mode.

Example 5 may include the apparatus of any one of examples 1-3, and/or some other examples herein, wherein the control logic is further to receive a USB2 receive active signal and, based upon the receive active signal, generate internal biases for the first mode.

Example 6 may include the apparatus of example 1, and/or some other examples herein, wherein the control logic further comprises a first calibration logic and a second calibration logic.

Example 7 may include the apparatus of example 6, and/or some other examples herein, wherein the control logic is to further enable a calibration mode, that is to be entered into prior to either of the first or second modes.

Example 8 may include the apparatus of example 7, and/or some other examples herein, wherein in the calibration mode the control logic is to further initiate offset training.

Example 9 may include the apparatus of example 8, and/or some other examples herein, wherein when the offset training is complete, the control logic is to store a first calibration configuration.

Example 10 may include the apparatus of example 8, and/or some other examples herein, wherein following the offset training, the control logic is to further initiate common mode (CM) adjustment training.

Example 11 may include the apparatus of example 8, and/or some other examples herein, wherein when the common mode (CM) adjustment training is complete, the control logic is to further store a second calibration configuration.

Example 12 may include the apparatus of example 8, and/or some other examples herein, wherein prior to entering into either of the first or second modes, the control logic is to further load the first calibration configuration.

Example 13 may include the apparatus of example 12, and/or some other examples herein, wherein following storage of the first calibration configuration, the control logic is further to initiate a high speed End Of Packet (EOP) detection.

Example 14 may include the apparatus of example 13, and/or some other examples herein, wherein: if an EOP is detected, the control logic is to cause the combination differential difference detector to enter the second mode; and if no EOP is detected, the control logic is to cause the combination differential difference detector to enter the first mode.

Example 15 may include the apparatus of example 14, and/or some other examples herein, wherein, if the combination differential difference detector enters the second mode, the control logic is to further load the second calibration configuration.

Example 16 may include the apparatus of example 1, and/or some other examples herein, wherein, in the second mode, the output of a disconnect signal includes EOP based filtering and sending the disconnect signal to the control logic.

Example 17 may include a method of managing high speed USB2 communications, comprising: using a combination differential difference detector, receiving differential positive (VDP) and differential negative (VDM) signals over a USB2 connection; selecting between a first sensing mode and a second sensing mode, wherein, in the first mode, the combination differential difference detector senses a first voltage difference between the VDP and VDM signals and outputs a squelch signal when the first voltage difference is less than or equal to a pre-defined value, and in the second mode, the combination differential difference detector senses a second voltage difference between the VDP and VDM signals and outputs a disconnect signal when the second voltage difference is greater than or equal to a pre-defined value.

Example 18 may include the method of example 17, and/or some other examples herein, further comprising, prior to the sensing in either of the first or second modes, obtaining and storing an offset calibration configuration and a common mode adjustment calibration configuration.

Example 19 may include the method of example 17, and/or some other examples herein, further comprising, prior to sensing in the first mode, loading an offset calibration configuration.

Example 20 may include the method of any one of examples 17-19, and/or some other examples herein, further comprising, prior to sensing in the second mode, first loading an offset calibration configuration, and then loading a common mode adjustment calibration configuration.

Example 21 may include the method of any one of examples 17-19, and/or some other examples herein, further comprising, in the first mode, outputting the squelch signal if the first voltage difference is <=100 mV.

Example 22 may include the method of any one of examples 17-19, and/or some other examples herein, further comprising, in the second mode, outputting a disconnect signal if the second voltage is >=625 mV.

Example 23 may include the method of any one of examples 17-19, and/or some other examples herein, further comprising, prior to operating in either the first mode or the second mode, entering a calibration mode comprising offset training.

Example 24 may include the method of example 23, and/or some other examples herein, further comprising following the offset training, initiating CM adjustment training.

Example 25 may include the method of example 23, and/or some other examples herein, further comprising when the offset training is complete storing a first calibration configuration in the combination differential difference detector.

Example 26 may include the method of example 24, and/or some other examples herein, further comprising when the CM adjustment training is complete, storing a second calibration configuration in the combination differential difference detector.

Example 27 may include the method of examples 18, and/or some other examples herein, further comprising following storage of the first calibration configuration, initiating a high speed EOP detection.

Example 28 may include the method of example 27, and/or some other examples herein, further comprising: if an EOP is detected, selecting the second mode; and if no EOP is detected, selecting the first mode.

Example 29 may include the method of example 28, and/or some other examples herein, wherein selecting the second mode includes first loading the second calibration configuration.

Example 30 may include the method of example 17, and/or some other examples herein, wherein outputting a disconnect signal includes EOP based filtering and sending the disconnect signal to USB2 Transceiver Macrocell Interface (UTMI) following the filtering.

Example 31 may include the apparatus of any one of examples 1-16, and/or some other examples herein, implemented in a USB2 compatible device.

Example 32 may include the apparatus of any one of examples 1-16, and/or some other examples herein, implemented in a laptop personal computer, "PC", a tablet PC, a smartphone, a wearable computing device, an Internet of Things (IoT) device, or a machine-type communications (MTC) device.

Example 33 may include one or more computer-readable media having instructions that, when executed by one or more processors of a computer device, cause the computer device to control a combination differential difference detector to: receive VDP and VDM signals over a USB2 connection; select between a first sensing mode and a second sensing mode, wherein, in the first mode: the combination differential difference detector senses a first voltage difference between the VDP and VDM signals and outputs a squelch signal when the first voltage difference is less than or equal to a pre-defined value, and in the second mode: the combination differential difference detector senses a second voltage difference between the VDP and VDM signals and outputs a disconnect signal when the second voltage difference is greater than or equal to a pre-defined value.

Example 34 may include the one or more computer-readable media of example 33, and/or some other examples herein, wherein the computer device, in response to execution of the instructions, is to further control the combination differential difference detector to, prior to sensing in either of the first or second modes, obtain and store an offset calibration configuration and a CM adjustment calibration configuration.

Example 35 may include the one or more computer-readable media of example 33, and/or some other examples herein, wherein the computer device, in response to execution of the instructions, is to further control the combination differential difference detector to, prior to sensing in the first mode, load an offset calibration configuration.

Example 36 may include the one or more computer-readable media of any one of examples 33-35, and/or some other examples herein, wherein the computer device, in response to execution of the instructions, is to further control the combination differential difference detector to, prior to sensing in the second mode, load an offset calibration configuration, and then load a common mode adjustment calibration configuration.

Example 37 may include the one or more computer-readable media of any one of examples 33-35, and/or some other examples herein, wherein the computer device, in response to execution of the instructions, is to further control the combination differential difference detector to, in the first mode, output the squelch signal if the first voltage difference is <=100 mV.

Example 38 may include the one or more computer-readable media of any one of examples 33-35, and/or some other examples herein, wherein the computer device, in response to execution of the instructions, is to further control the combination differential difference detector to, in the second mode, outputting a disconnect signal if the second voltage is >=625 mV.

Example 39 may include the one or more computer-readable media of any one of examples 33-35, and/or some other examples herein, wherein the computer device, in response to execution of the instructions, is to further control the combination differential difference detector to, prior to operating in either the first mode or the second mode, enter a calibration mode comprising offset training.

Example 40 may include the one or more computer-readable media of example 38, and/or some other examples herein, wherein the computer device, in response to execution of the instructions, is to further control the combination differential difference detector to, following the offset training, initiate CM adjustment training.

Example 41 may include the one or more computer-readable media of example 38, and/or some other examples herein, wherein the computer device, in response to execution of the instructions, is to further control the combination differential difference detector to, when the offset training is complete, store a first calibration configuration.

Example 42 may include the one or more computer-readable media of example 38, and/or some other examples herein, wherein the computer device, in response to execution of the instructions, is to further control the combination differential difference detector to, when the CM adjustment training is complete, store a second calibration configuration in the combination differential difference detector.

Example 43 may include the one or more computer-readable media of example 34, and/or some other examples herein, wherein the computer device, in response to execution of the instructions, is to further control the combination differential difference detector to, following storage of the first calibration configuration, initiate a high speed EOP detection.

Example 44 may include the one or more computer-readable media of example 43, and/or some other examples herein, wherein the computer device, in response to execution of the instructions, is to further control the combination differential difference detector to: if an EOP is detected, select the second mode; and if no EOP is detected, select the first mode.

Example 45 may include the one or more computer-readable media of example 44, and/or some other examples herein, wherein enter the second mode includes first loading the second calibration configuration.

Example 46 may include the one or more computer-readable media of example 33, and/or some other examples herein, wherein output a disconnect signal includes EOP based filtering and sending the disconnect signal to a UTMI following the filtering.

Example 47 may include an apparatus for managing high speed USB2 communications, comprising: means for receiving first and second input signals; means for selecting between a first sensing mode and a second sensing mode; means for sensing voltage differences, to, in the first sensing mode: sense a first voltage difference between the first and second input signals and output a squelch signal when the first voltage difference is less than or equal to a pre-defined value; and to, in the second sensing mode: sense a second voltage difference between the first and second input signals and output a disconnect signal when the second voltage difference is greater than or equal to a pre-defined value. The apparatus may also include means, coupled to the means for sensing and the means for selecting, for enabling either the first mode or the second mode; and means, coupled to each of the means for sensing and the means for enabling, for providing a reference current and reference voltages to the means for sensing for each of the first and second modes.

Example 48 may include the apparatus of example 47, and/or some other examples herein, wherein, in the first mode, a squelch signal is output if the first voltage difference is <=100 mV.

Example 49 may include the apparatus of example 47, and/or some other examples herein, wherein, in the second mode, a disconnect signal is output if the second voltage is >=625 mV.

Example 50 may include the apparatus of any one of examples 47-49, and/or some other examples herein, wherein the means for enabling is further to receive a USB2 transmit valid signal and, based upon the transmit valid signal, enable the second mode of the means for sensing.

Example 51 may include the apparatus of any one of examples 47-49, and/or some other examples herein, wherein the means for enabling is further to receive a USB2 receive active signal and, based upon the receive active signal, enable the first mode of the means for sensing.

Example 52 may include the apparatus of any one of examples 47-49, and/or some other examples herein, wherein the means for enabling further comprises a first calibration means and a second calibration means.

Example 53 may include the apparatus of example 52, and/or some other examples herein, wherein the means for enabling is to further enable a calibration mode, to be entered into by the means for sensing, prior to entering either of the first or second modes.

Example 54 may include the apparatus of example 53, and/or some other examples herein, wherein once the means for sensing is in the calibration mode the means for enabling is to further initiate offset training.

Example 55 may include the apparatus of example 54, and/or some other examples herein, wherein when the offset training is complete, the means for enabling is to store a first calibration configuration.

Example 56 may include the apparatus of example 54, and/or some other examples herein, wherein following the offset training, the means for enabling is to further initiate CM adjustment training for the means for sensing.

Example 57 may include the apparatus of example 56, and/or some other examples herein, wherein when the CM adjustment training is complete, the means for enabling is to further store a second calibration configuration.

Example 58 may include the apparatus of example 47, and/or some other examples herein, wherein prior to the means for sensing entering into either of the first or second modes, the means for enabling is to further load the first calibration configuration.

Example 59 may include the apparatus of example 58, and/or some other examples herein, wherein following storage of the first calibration configuration, the means for enabling is to further cause the means for sensing to initiate a high speed EOP detection.

Example 60 may include the apparatus of example 59, and/or some other examples herein, wherein: if an EOP is detected, the means for enabling is to cause the means for selecting to select the second mode; and if no EOP is detected, the means for enabling is to cause the means for selecting to enter the first mode.

Example 61 may include the apparatus of example 60, and/or some other examples herein, wherein, if the means for selecting selects the second mode, the means for enabling is to further load the second calibration configuration.

Example 62 may include the apparatus of example 47, and/or some other examples herein, wherein in the second mode, the output of a disconnect signal includes EOP based filtering and sending the disconnect signal to the means for enabling.

What is claimed is:

1. An apparatus for managing high speed Universal Serial Bus 2.0 (USB2) communications, comprising:
   a combination differential difference detector to receive first and second input signals detected on a USB2 bus, the combination differential difference detector to, in a receive mode:
   sense a first voltage difference between the first and second input signals and output a squelch state signal when the first voltage difference is less than or equal to a first pre-defined value, the first voltage difference denoting either a squelch state or an un-squelch state; and to, in a transmit mode:
   sense a second voltage difference between the first and second input signals and output a disconnect state signal when the second voltage difference is greater than or equal to a second pre-defined value, the second voltage difference denoting either a connect state or a disconnect state, and the first and second pre-defined values being different pre-defined values;
   wrapper logic coupled to the combination differential difference detector, the wrapper logic to initiate common mode (CM) adjustment training to enable the combination differential difference detector to be used for either the receive mode or the transmit mode, and to enable the combination differential difference detector to operate in either the receive mode or the transmit mode; and
   a bias voltage and bias current generator, coupled to each of the combination differential difference detector and the wrapper logic, to provide a first reference current and first reference voltages to the combination differential difference detector in the receive mode, and to provide a second reference current and second reference voltages to the combination differential difference detector in the transmit mode, the first and second reference currents being different reference currents, and the first and second reference voltages being different reference voltages.

2. The apparatus of claim 1, wherein, in the receive mode, the squelch state signal is outputted in response to the first voltage difference being <=100 millivolts (mV).

3. The apparatus of claim 1, wherein, in the transmit mode, the disconnect state signal is outputted in response to the second voltage difference being >=625 mV.

4. The apparatus of claim 1, wherein the wrapper logic is further to receive a USB2 transmit valid signal and, based at least in part on the transmit valid signal, generate internal signals for the transmit mode.

5. The apparatus of claim 1, wherein the wrapper logic is further to receive a USB2 receive active signal and, based at least in part on the receive active signal, generate internal biases for the receive mode.

6. The apparatus of claim 1, wherein the wrapper logic further comprises a first calibration logic and a second calibration logic.

7. The apparatus of claim 6, wherein the wrapper logic is to further enable a calibration mode that is to be entered into prior to either of the receive mode or the transmit mode.

8. The apparatus of claim 7, wherein, in the calibration mode, the wrapper logic is to further initiate offset training.

9. The apparatus of claim 8, wherein, when the offset training is complete, the wrapper logic is to store a first calibration configuration.

10. The apparatus of claim 8, wherein the wrapper logic initiates one or more common mode (CM) adjusters external to the wrapper logic to perform the CM adjustment training, following the offset training.

11. The apparatus of claim 10, wherein, when the CM adjustment training is complete, the wrapper logic is to further store a second calibration configuration.

12. The apparatus of claim 9, wherein, prior to entering into either of the receive mode or the transmit modes, the wrapper logic is to further load the first calibration configuration.

13. The apparatus of claim 12, wherein, following storage of the first calibration configuration and prior to enabling the combination differential difference detector to operate in either the receive mode or the transmit mode, the wrapper logic is further to initiate a high speed End Of Packet (EOP) detection.

14. The apparatus of claim 13, wherein:
   in response to a detection off an EOP, the wrapper logic is to cause the combination differential difference detector to enter the transmit mode; and
   in response to -non-detection of an EOP, the wrapper logic is to cause the combination differential difference detector to enter the receive mode.

15. The apparatus of claim 14, wherein, after enabling the combination differential difference detector to enters the transmit mode, the wrapper logic is to further load the second calibration configuration.

16. The apparatus of claim 1, wherein, in the transmit mode, the output of the disconnect state signal includes performance of EOP based filtering and transmission of the disconnect state signal to the wrapper logic.

17. A method of managing high speed USB2 communications, comprising:
   using a combination differential difference detector, receiving differential positive ($V_{DP}$) and differential negative ($V_{DM}$) voltage signals detected over a USB2 connection; and
   selecting the combination differential difference detector to operate in either a receive mode or a transmit mode, wherein,
   in the receive mode:
   the combination differential difference detector senses a first voltage difference between the $V_{DP}$ and $V_{DM}$ signals and outputs a squelch state signal when the first voltage difference is less than or equal to a first pre-defined value, the first voltage difference indicating either a squelch state or a non-squelch state,
   and in the transmit mode:
   the combination differential difference detector senses a second voltage difference between the $V_{DP}$ and $V_{DM}$ signals and outputs a disconnect state signal when the second voltage difference is greater than or equal to a second pre-defined value, the second voltage difference indicating either a connect state or a disconnect state, and the first and second pre-defined values being different pre-defined values;
   wherein the method further comprises
   prior to selecting the combination differential difference detector to operate in either the receive mode or the transmit mode, initiating common mode (CM) adjustment training to enable the combination differential difference detector to be used for either the receive mode or the transmit mode, and on selecting the combination differential difference detector to operate in either the receive mode or the transmit mode, providing a first reference current and first reference voltages to the combination differential difference detector in response to selecting the receive mode, and providing a second reference current and second reference voltages to the combination differential difference detector in response to selecting the transmit mode, the first and second reference currents being different reference currents, and the first and second reference voltages being different reference voltages.

18. The method of claim 17, further comprising, prior to the combination differential difference detector sensing in either the receive mode or the transmit modes, obtaining and storing an offset calibration configuration and a common mode adjustment calibration configuration.

19. The method of claim 17, further comprising, prior to the combination differential difference detector sensing in the receive mode, loading an offset calibration configuration.

20. The method of claim 17, further comprising, prior to sensing in the transmit mode, first loading an offset calibration configuration, and then loading a common mode adjustment calibration configuration.

21. The method of claim 17, wherein, in the receive mode, the combination differential difference detector outputs the squelch state signal in response to the first voltage difference is <=100 mV.

22. The method of claim 17, wherein, in the transmit mode, combination differential difference detector outputs a disconnect state signal in response to the second voltage is >=625 mV.

23. The method of claim 17, further comprising, prior to selecting the combination differential difference detector to operate in either the receive mode or the transmits mode, entering a calibration mode comprising offset training.

24. The method of claim 23, wherein the initiating of CM adjustment training follows the offset training.

25. The method of claim 24, further comprising, when the offset training is complete, storing a first calibration configuration in the combination differential difference detector, and when the CM adjustment training is complete, storing a second calibration configuration in the combination differential difference detector.

\* \* \* \* \*

UNITED STATES PATENT AND TRADEMARK OFFICE
CERTIFICATE OF CORRECTION

| | |
|---|---|
| PATENT NO. | : 11,029,750 B2 |
| APPLICATION NO. | : 15/638049 |
| DATED | : June 8, 2021 |
| INVENTOR(S) | : Amit Kumar Srivastava et al. |

It is certified that error appears in the above-identified patent and that said Letters Patent is hereby corrected as shown below:

In the Specification

Column 20
Line 25, "...-non-detection..." should read – "...non-detection..."
Line 29, "...to enters..." should read – "...to enter..."

Signed and Sealed this
Tenth Day of September, 2024

Katherine Kelly Vidal
Director of the United States Patent and Trademark Office